(12) United States Patent
Shiratori et al.

(10) Patent No.: US 10,583,791 B2
(45) Date of Patent: Mar. 10, 2020

(54) WIRE HARNESS

(71) Applicant: Yazaki Corporation, Tokyo (JP)

(72) Inventors: Tatsuya Shiratori, Shizuoka (JP); Masahiro Ito, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 193 days.

(21) Appl. No.: 15/632,769

(22) Filed: Jun. 26, 2017

(65) Prior Publication Data

US 2018/0001848 A1 Jan. 4, 2018

(30) Foreign Application Priority Data

Jun. 29, 2016 (JP) ................. 2016-128708

(51) Int. Cl.
*B60R 16/00* (2006.01)
*B60R 16/02* (2006.01)
*B60R 16/023* (2006.01)

(52) U.S. Cl.
CPC ........ *B60R 16/0215* (2013.01); *B60R 16/005* (2013.01); *B60R 16/0207* (2013.01); *B60R 16/0231* (2013.01); *B60R 16/0238* (2013.01)

(58) Field of Classification Search
USPC ...................................... 307/10.1
See application file for complete search history.

(56) References Cited

U.S. PATENT DOCUMENTS

| 5,912,511 | A | 6/1999 | Hidaka |
| 2002/0067077 | A1 | 6/2002 | Hentschel et al. |

| 2002/0130553 | A1* | 9/2002 | Kimura | B60R 16/0215 307/10.1 |
| 2008/0079289 | A1* | 4/2008 | Wozniak | B60R 16/0207 296/193.07 |
| 2016/0149329 | A1 | 5/2016 | Nakata | |

FOREIGN PATENT DOCUMENTS

| JP | 8-251755 | A | | 9/1996 |
| JP | 08251755 | | * | 9/1996 |
| JP | 9-254721 | A | | 9/1997 |
| JP | 2001-245417 | A | | 9/2001 |
| JP | 2001245417 | | * | 9/2001 |
| JP | 2009-292190 | A | | 12/2009 |
| JP | 2009292190 | | * | 12/2009 |
| JP | 2011-51506 | A | | 3/2011 |

(Continued)

OTHER PUBLICATIONS

Communication dated Jun. 26, 2018 from the Japanese Patent Office in counterpart Application No. 2016-128708.

*Primary Examiner* — Hal Kaplan
*Assistant Examiner* — Xuan Ly
(74) *Attorney, Agent, or Firm* — Sughrue Mion, PLLC (57) ABSTRACT

A wire harness includes a trunk line section including a power line for power supply as a wiring body wired in a vehicle, a distributor that is connected to the trunk line section and distributes electric power from a power supply mounted on the vehicle to an appliance to be connected, and a ground plate for grounding buried in a resin flooring material of the vehicle separately from the trunk line section. Thus, with the wire harness, a wiring path can be simplified by combining the trunk line section, the distributor, and the ground plate.

11 Claims, 6 Drawing Sheets

(56) References Cited

FOREIGN PATENT DOCUMENTS

| | | |
|---|---|---|
| JP | 2012-174666 A | 9/2012 |
| JP | 2014-90579 A | 5/2014 |
| JP | 2016-101046 A | 5/2016 |
| JP | 2016-107874 A | 6/2016 |
| JP | 2016-110811 A | 6/2016 |

* cited by examiner

WIRE HARNESS

CROSS-REFERENCE TO RELATED APPLICATION(S)

The present application claims priority to and incorporates by reference the entire contents of Japanese Patent Application No. 2016-128708 filed in Japan on Jun. 29, 2016.

BACKGROUND OF THE INVENTION

1. Field of the Invention

The present invention relates to a wire harness.

2. Description of the Related Art

As a wire harness in the related art applied to a vehicle, for example, Japanese Patent Application Laid-open No. 9-254721 discloses a wire harness for automobiles that can be used in common for four types of vehicles including a right-hand drive vehicle, a left-hand drive vehicle, a sedan-type vehicle, and a van-type vehicle. In the wire harness for automobiles, a front harness and an integrated harness of a floor harness and a rear harness are wired along the same path as a common harness for the four types of vehicles, an integrated harness of a cowl harness and an instrument harness is caused to be different between the right-hand drive vehicle and the left-hand drive vehicle, and a connection part between the front harness and the integrated harness of the floor harness and the rear harness is arranged on the same side, that is, the left side or the right side.

However, the wire harness for automobiles disclosed in Japanese Patent Application Laid-open No. 9-254721 can be further improved in view of simplification of wiring path.

SUMMARY OF THE INVENTION

The present invention is made in view of such a situation, and provides a wire harness that can simplify a wiring path.

In order to achieve the above mentioned object, a wire harness according to one aspect of the present invention includes a trunk line section including a power line for power supply as a wiring body wired in a vehicle; a distributor that is connected to the trunk line section and distributes electric power from a power supply mounted on the vehicle to an appliance to be connected; and a ground plate for grounding buried in a resin flooring material of the vehicle separately from the trunk line section.

According to another aspect of the present invention, in the wire harness, it is possible to configure that the trunk line section includes a communication line for signal communication serving as a wiring body bundled with the power line and wired in the vehicle.

According to still another aspect of the present invention, in the wire harness, it is possible to further include that a communication line for signal communication serving as a wiring body wired in the vehicle separately from the trunk line section, wherein the trunk line section may be wired on one side of the ground plate with respect to a vertical direction, and the communication line may be wired on another side of the ground plate with respect to the vertical direction.

According to still another aspect of the present invention, in the wire harness, it is possible to configure that the distributor includes a fastened and grounded part that is fastened to the vehicle and connected to the ground plate.

According to still another aspect of the present invention, in the wire harness, it is possible to configure that the distributor includes a plurality of divided bodies that are able to be coupled to each other via coupling unit and are able to be divided from each other via the coupling unit.

According to still another aspect of the present invention, in the wire harness, it is possible to configure that the distributor includes a pair of trunk line end distributors each of which is connected to a corresponding one of both ends of the trunk line section, and a trunk line middle distributor to which a power storage device that is mounted on the vehicle and accumulates electric power is connected, the trunk line middle distributor being interposed in the trunk line section between the pair of trunk line end distributors.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes embodiments of the present invention in detail based on the drawings. The present invention is not limited to the embodiments. Components in the following embodiments include a component that can be easily replaced by those skilled in the art, or substantially the same component.

First Embodiment

Figure 1:
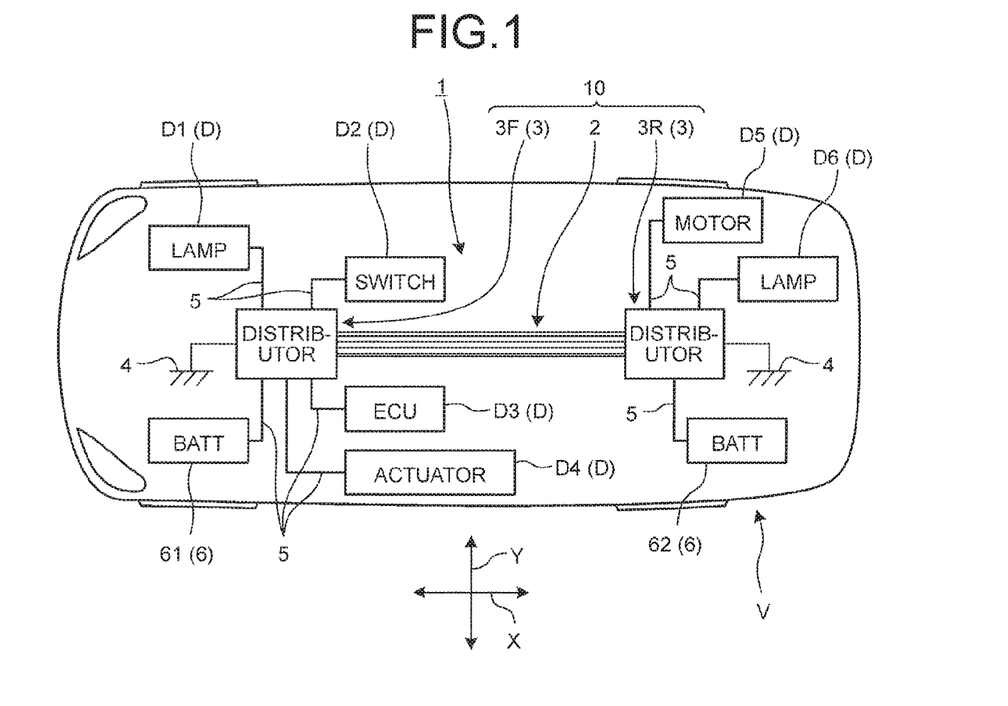
FIG. 1 is a schematic block diagram illustrating a schematic configuration of a vehicle to which a wire harness according to a first embodiment is applied.
Figure 2:
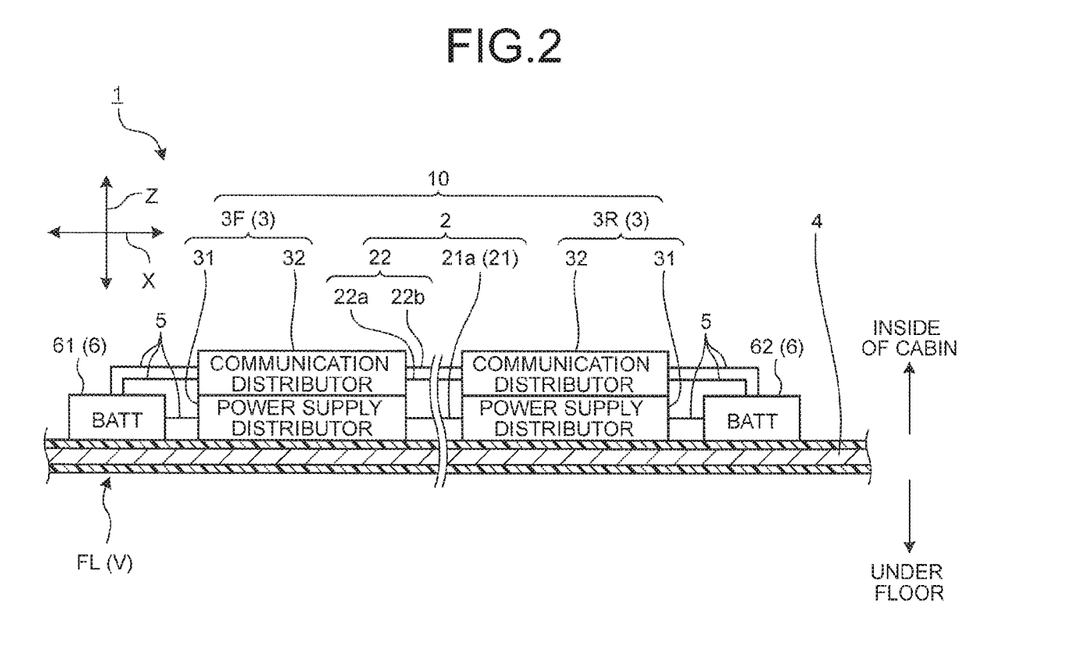
FIG. 2 is a schematic block diagram illustrating a schematic configuration of the wire harness according to the first embodiment.
Figure 3:
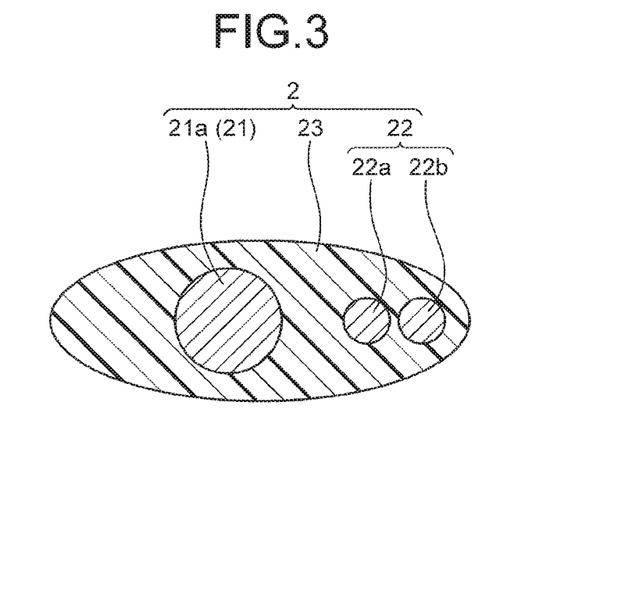
FIG. 3 is a schematic cross-sectional view illustrating a schematic configuration of a linear trunk line section of the wire harness according to the first embodiment.

A wire harness 1 according to the present embodiment illustrated in FIGS. 1, 2, and 3 is a wire harness module that is applied to a vehicle V, connects devices mounted on the vehicle V with each other, and is used for power supply and signal communication. The wire harness 1 is a structural electric module in which a linear trunk line section 2 serving as a trunk line section is wired along a vehicle longitudinal direction X of the vehicle V, and supplies electric power to various appliances D mounted on the vehicle V via distributors 3 connected to the linear trunk line section 2. In the wire harness 1 according to the present embodiment, the linear trunk line section 2 and the distributors 3 constitute a common trunk line 10, middle wiring bodies 5 are wired to be spread around the distributors 3 constituting the common trunk line 10, and the distributors 3 are connected to the appliances D to simplify a wiring path. In the wire harness 1 according to the present embodiment, typically, the common trunk line 10 is made standardized and commoditized as much as possible irrespective of the type of a vehicle, platform, vehicle grade, and the like to which the common trunk line 10 is applied, and each of the middle wiring bodies 5 and the like connecting the distributors 3 with the appliances D are made variable in accordance with the type of a vehicle, platform, vehicle grade, and the like. Accordingly, the wiring path can be simplified as described above, versatility can be improved due to a standardized and commoditized member, and optimization can be achieved due to selection diversity of a member in a good balance. The following describes the configuration of the wire harness 1 in detail with reference to the drawings.

Herein, the vehicle V to which the wire harness 1 is applied, the "vehicle longitudinal direction X" typically corresponds to the entire length direction of the vehicle V, that is, corresponds to a direction along a front-rear straight advancing direction of the vehicle V. The "vehicle width direction Y" typically corresponds to the entire width direction of the vehicle V, and corresponds to a vehicle horizontal direction of the vehicle V. The "vehicle height direction Z" typically corresponds to a vehicle height direction of the vehicle V. The vehicle longitudinal direction X as a first direction, the vehicle width direction Y as a second direction, and the vehicle height direction Z as a third direction are orthogonal to each other. In a state in which the vehicle V is positioned on a horizontal plane, the vehicle longitudinal direction X and the vehicle width direction Y are along a horizontal direction, and the vehicle height direction Z is along a vertical direction. In the following description, regarding the vehicle longitudinal direction X, a side to which the vehicle V moves frontward may be referred to as the "front", and a side to which the vehicle V moves rearward may be referred to as the "rear". Regarding the vehicle width direction Y, the left side with respect to the front of the vehicle longitudinal direction X may be referred to as the "left side", and the right side with respect to the front of the vehicle longitudinal direction X may be referred to as the "right side". Regarding the vehicle height direction Z, an upper side in the vertical direction may be referred to as an "upper side", and a lower side in the vertical direction may be referred to as a "lower side". The directions used in the following description each represent a direction in a state in which components are assembled to each other unless otherwise specified.

Specifically, as illustrated in FIGS. 1, 2, and 3, the wire harness 1 includes the linear trunk line section 2, the distributors 3, a ground plate 4, and the middle wiring bodies 5.

The linear trunk line section 2 includes a power supply line 21. The linear trunk line section 2 according to the present embodiment also includes a plurality of communication lines 22 for signal communication bundled with the power supply line 21. The power supply line 21 and the communication line 22 are linear wiring bodies wired in the vehicle V, and constitute part of a plurality of circuits in the wire harness 1. The linear trunk line section 2 is configured by bundling a plurality of power supply lines 21 and communication lines 22 serving as linear wiring bodies. In this case, the linear wiring body is typically a wiring body having a pair of ends, that is, a wiring body that is formed in a linear shape and does not have branching between the pair of ends. That is, the linear trunk line section 2 configured by bundling the power supply lines 21 and the communication lines 22 as the linear wiring bodies is formed in a linear shape and does not have branching between the pair of ends.

The power supply line 21 is a linear conductor used for power supply to supply electric power for driving each appliance D. In the drawings, the power supply lines 21 according to the present embodiment include one power line 21a for power supply. Alternatively, a plurality of power lines for power supply may be bundled to configure the power supply lines 21. The power line 21a is, for example, a wiring body that supplies electric power of a predetermined voltage (for example, 12 V or 48 V). The power supply line 21 (power line 21a) may be a power supply line for a direct current or for an alternate current depending on a specification and the like required for making the lines standardized and commoditized. The communication lines 22 are linear conductors used for signal communication to supply various signals to each appliance D. The communication lines 22 according to the present embodiment include two lines in total, that is, communication lines 22a and 22b for communication. Each of the communication lines 22a and 22b for example, a wiring body for implementing various communication systems example, for SIG+ or SIG−). In the following description, when the communication lines 22a and 22b are not required to be distinguished from each other, the communication lines 22a and 22b are simply referred to as the communication line 22.

The power supply line 21 (the power line 21a) and the communication lines 22 is constituted of, for example, an electric wire obtained by applying an insulating coating to a core wire configured by bundling or twisting a plurality of conductive metal wires, a metal bar obtained by applying an insulating coating to a conductive bar member, a busbar, and a plane circuit body (for example, flexible printed circuits (FPC) and a flexible flat cable (FFC)). Each of the communication lines 22 may include a cable for optical communication. The power supply line 21 and the communication lines 22, that is, the power line 21a and the communication lines 22a and 22b are, for example, bundled together via a common insulating coat is 23 and the like to constitute the linear trunk line section 2. The linear trunk line section 2 may be configured such that the power line 21a and the communication lines 22a and 22b to which the insulating coating is individually applied are bundled together with an exterior part such as wound tape, a corrugated tube, and a binding band. Additionally, an exterior part such as a grommet, a protector, and a fixture may be assembled to the linear trunk line section 2. The linear trunk line section 2 is wired along the vehicle longitudinal direction X.

Each of the distributors 3 distributes various types of electric power to each appliance D. The distributor is typically a connection center part for each appliance D via the corresponding middle wiring body 5, and constitutes what is called a connection hub for each appliance D. The distributor 3 according to the present embodiment includes a pair of trunk line end distributors 3F and 3R connected to both ends of the linear trunk line section 2. The trunk line end distributor 3F is connected to a front end in the vehicle longitudinal direction X of the linear trunk line section 2. The trunk line end distributor 3R is connected to a rear end in the vehicle longitudinal direction X of the linear trunk line section 2. Each of the trunk line end distributors 3F and 3R includes a power supply distributor 31 and a communication distributor 32. In the following description, when the trunk line end distributors 3F and 3R are not required to be distinguished from each other, the trunk line end distributors 3F and 3R are simply referred to as the distributor 3. In the example of FIG. 2, each distributor 3 is illustrated such that the power supply distributor 31 is integrated with the communication distributor 32 to configure one box unit. However, the embodiment is not limited thereto. The power supply distributor 31 and the communication distributor 32 may be separately configured and connected to each other.

To each power supply distributor 31, the power supply line 21 of the linear trunk line section 2 is connected, and the appliance D is connected via the middle wiring body 5. Each power supply distributor 31 distributes electric power for driving each appliance D to each appliance D to be connected from a power supply 6 to perform power supply. The power supply 6 mounted on the vehicle V is connected to at least one end of each power supply distributor 31 via the middle wiring body 5 and the like. In other words, the linear trunk line section 2 is connected to the power supply 6 via the power supply distributor 31 of the distributor 3, and electric power is supplied thereto from the power supply 6 via the power supply distributor 31 of the distributor 3. In this case, the power supply 6 mounted on the vehicle V is constituted of, for example, a power generator or a battery that generates electric power such as an alternator, and a power storage device that accumulates electric power such as a condenser, a capacitor, a secondary battery unit, and a thin sheet battery. In the example of FIGS. 1 and 2, a battery (BATT) 61 and a battery (BATT) 62 each serving as a power storage device are illustrated as the power supply 6 mounted on the vehicle V. The battery 61 is connected to the power supply distributor 31 of the trunk line end distributor 3F via the middle wiring body 5 and the like, and the battery 62 is connected to the power supply distributor 31 of the trunk line end distributor 3R via the middle wiring body 5 and the like. For example, in the following description, the battery 61 configures a main power supply 6 in the vehicle V, and the battery 62 configures a secondary power supply 6 for backup in the vehicle V. However, the embodiment is not limited thereto. At least one of power supplies 6 may be connected to any of a plurality of power supply distributors 31. It can be said that each power supply distributor 31 incorporates a function of what is called an electric connection box such as a junction block that distributes electric power supplied from the power supply 6 to each appliance D to be connected, a fuse box, and a relay box. Each power supply distributor 31 includes, for example, various power supply distribution functional components related to power supply distribution such as a relay, a resistor, a transistor, an intelligent power switch (IPS), and a power supply control box unitizing them, and a housing that houses the various power supply distribution functional components. Each power supply distributor 31 may include a circuit protection unit such as a fuse that protects an electric circuit of each appliance D from a large electric current equal to or larger than a rated current. Each power supply distributor 31 may include a control device such as an electronic control unit (ECU).

The communication line 22 of the linear trunk line section 2 is connected to each communication distributor 32, and the appliance D is connected thereto via the middle wiring body 5. Each communication distributor 32 distributes various signals to each of the connected appliances D to perform signal communication. Each communication distributor 32 includes, for example, various communication functional components related to signal communication such as various transmission/reception devices, and a housing that houses the various communication functional components. Examples of a communication protocol executed by each communication line 22 and each communication distributor 32 include CAN communication, CAN-FD, Ethernet (registered trademark), and power line communications (PLC). However, the embodiment is not limited thereto. Each communication distributor 32 may include a control device such as an ECU. Each communication distributor 32 may have a function of a communication gateway. Each communication distributor 32 may include an optical functional component related to optical communication as needed.

Each end of the power supply line 21 and the communication line 22 of the linear trunk line section 2 is connected to a corresponding one of the power supply distributor 31 and the communication distributor 32 via a connection part such as a connector. In other words, a connection part such as a connector arranged at one end (front end in the vehicle longitudinal direction X) of the power supply line 21 and the communication line 22 of the linear trunk line section 2 are respectively connected to the power supply distributor 31 and the communication distributor 32 of the trunk line end distributor 3F. On the other hand, a connection part such as a connector arranged at the other end (rear end in the vehicle longitudinal direction X) of the power supply line 21 and the communication line 22 of the linear trunk line section 2 are respectively connected to the power supply distributor 31 and the communication distributor 32 of the trunk line end distributor 3R. That is, the linear trunk line section 2 is connected to the trunk line end distributor 3F and the trunk line end distributor 3R via the connection part such as a connector, extends between the trunk line end distributor 3F and the trunk line end distributor 3R, and connects the pair of the trunk line end distributor 3F and the trunk line end distributor 3R to each other. One end of the middle wiring body 5 is connected to a corresponding one of the power supply distributor 31 and the communication distributor 32 via a connection part such as a connector. Each of the power supply distributor 31 and the communication distributor 32 is electrically, and optically as needed, connected to the power supply line 21 and the communication line 22 of the linear trunk line section 2 and the middle wiring body 5 via the connection part such as a connector, (Hereinafter, the same description means that components are also optically connected as needed.)

The linear trunk line section 2 and the distributor 3 constitute the common trunk line 10. Typically, it is preferable that the common trunk line 10 is made standardized and commoditized irrespective of a type of a vehicle, a platform, a grade of a vehicle, and the like to which the common trunk line 10 is applied. The common trunk line 10 configures a main power supply line unit in an electric module of the vehicle V, and is called a backbone in some cases, for example. The common trunk line 10 is arranged in the vehicle V in a positional relation such that the linear trunk line section 2 is wired along the vehicle longitudinal direction X at substantially the center in the vehicle width direction Y, the trunk line end distributor 3F is positioned at the front end in the vehicle longitudinal direction X, and the trunk line end distributor 3R is positioned at the rear end in the vehicle longitudinal direction X. For example, the trunk line end distributor 3F is positioned under a dashboard and the like on the front side in the vehicle longitudinal direction X of the vehicle V, and the trunk line end distributor 3R is positioned in the back of a rear seat and the like on the rear side in the vehicle longitudinal direction X of the vehicle V. The linear trunk line section 2 and the distributor 3 of the common trunk line 10 are arranged on one side of a flooring material (floor panel) FL of the vehicle V with respect to the vehicle height direction Z (vertical direction) along the flooring material FL, and fixed to the flooring material FL and the like via a fixture such as various clamps and clips, for example. The flooring material FL is supported by a wheel of the vehicle V via a suspension. The flooring material FL according to the present embodiment is a resin panel formed in a plane shape using a resin material, for example, a resin material having relatively high rigidity. That is, the wire harness 1 according to the present embodiment is an electric module applied to the flooring material FL of the vehicle V the exterior of which is partially constituted of the resin flooring material FL. In the example of FIG. 2, the linear trunk line section 2 and the distributor 3 are arranged on the inside of a compartment as an upper side in the vertical direction of the flooring material FL. However, the embodiment is not limited thereto. Both of the linear trunk line section 2 and the distributor 3 may be arranged under the floor (outside of the compartment) as a lower side in the vertical direction of the flooring material FL. Alternatively, one of the linear trunk line section 2 and the distributor 3 may be arranged on the inside of the compartment, and the other one thereof may be arranged under the floor.

The ground plate 4 is a metal plate for grounding for establishing a ground. The ground plate 4 according to the present embodiment is configured separately from the linear trunk line section 2, and buried in the resin flooring material FL of the vehicle V. The ground plate 4 is, for example, formed in a plane shape with a metallic material having electrical conductivity (for example, a metallic material including any one of copper, aluminum, and iron). For example, the ground plate 4 may be formed in a flat plate shape with the metallic material, may be formed in a grid plate shape with the metallic material, or may be formed in a net plate shape obtained by reticulately weaving metal wires constituted of the metallic material. The ground plate 4 is, for example, formed inside the resin flooring material FL integrally with the flooring material FL by insert molding and the like to be buried inside the resin flooring material FL. Accordingly, for example, the ground plate 4 constitutes a metal plate for grounding in the vehicle V the vehicle body of which including the flooring material FL is constituted of a resin material instead of a metallic material. Although it is sufficient that the ground plate 4 is buried at least in part of the flooring material FL, the ground plate 4 is preferably buried in a half or more region of the flooring material FL. More preferably, the ground plate 4 is buried in substantially the whole flooring material FL.

Figure 4:
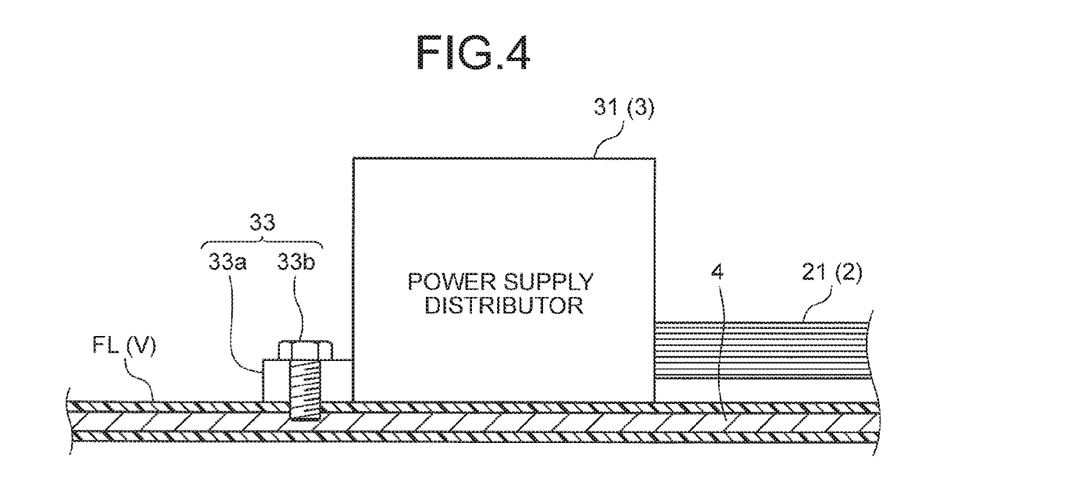
FIG. 4 is a schematic cross-sectional view illustrating a schematic, configuration of fastened and grounded part of the wire harness according to the first embodiment.

As illustrated in FIG. 4, the trunk line end distributors 3F and 3R according to the present embodiment include a fastened and grounded part 33 that is fastened to the vehicle V and grounded on the ground plate 4. The fastened and grounded part 33 according to the present embodiment is fastened to the resin flooring material FL of the vehicle V, and electrically connected to the ground plate 4 buried in the flooring material FL. For example, the fastened and grounded part 33 includes a conductive metal bracket 33a projecting from the housing of each power supply distributor 31 of the trunk line end distributors 3F and 3R, and a metal fastening member 33b such as a bolt that fastens and fixes the bracket 33a to the flooring material FL and electrically connects the bracket 33a to the ground plate 4 buried in the flooring material FL. Accordingly, each of the trunk line end distributors 3F and 3R is grounded on the ground plate 4 by the fastened and grounded part 33.

Returning to FIG. 1, the middle wiring body 5 is a wiring body that is interposed between each distributor 3 and the appliance D, and between each distributor 3 and each power supply 6, and electrically connects each distributor 3 to the appliance D and each power supply 6. Each middle wiring body 5 includes a power supply line such as a power line and a ground line and various communication lines in accordance with a request from the appliance D. Similarly to the linear trunk line section 2, for example, each middle wiring body 5 is constituted of an electric wire obtained by applying an insulating coating to a core wire configured by bundling or twisting a plurality of conductive metal wires, a metal bar obtained by applying an insulating coating to a conductive bar member, a busbar, a plane circuit body, and the like. Each middle wiring body 5 may include a cable for optical communication in accordance with a request from the appliance D. Similarly to the linear trunk line section 2, each middle wiring body 5 may be configured to be bundled together via a common insulating coating and the like, and for example, may be configured to be bundled together via an exterior part such as wound tape, a corrugated tube, and a binding band. Additionally, an exterior part such as a grommet, a protector, and a fixture may be assembled therewith. One end of each middle wiring body 5 is connected to the trunk line end distributor 3F, the trunk line end distributor 3R, and the like via a connection part such as a connector, and the other end thereof is connected to the appliance D, the batteries 61 and 62 constituting the power supply 6, and the like via a connection part such as a connector. That is, each middle wiring body 5 is connected to the trunk line end distributor 3F, the trunk line end distributor the appliance D, the batteries 61 and 62, and the like via a connection part such as a connector, and extends between each of the trunk line end distributor 3F, the trunk line end distributor 3R, and the like and each of the appliance D, the batteries 61 and 62, and the like to electrically connect them to each other. As the appliance D connected to each distributor 3 via the middle wiring body 5, FIG. 1 exemplifies a lamp D1, a switch D2, an ECU D3, and an actuator D4 that are connected to the trunk line end distributor 3F, and a motor D5 and a lamp D6 that are connected to the trunk line end distributor 3R. However, the embodiment is not limited thereto. A branch part may be further provided to each middle wiring body 5 connected to the appliance D, a plurality of appliances D may be connected thereto, and the whole of them may be modularized to configure a sub-module to implement a circuit with higher density and higher efficiency. To secure selection diversity, for example, a plurality of types of middle wiring bodies 5 may be prepared such that a length, a diameter, material, a shape, the number of branches, and the like of each middle wiring body 5 are made variable in accordance with a type of a vehicle, a platform, a grade of a vehicle, and the like to which the middle wiring body 5 is applied, and any one thereof may be appropriately selected to be applied.

The wire harness 1 described above includes the linear trunk line section 2 including the power line 21a for power supply serving as a wiring body wired in the vehicle V, the distributor 3 that is connected to the linear trunk line section 2 and distributes electric power from the power supply 6 mounted on the vehicle V to the appliance D to be connected, and the ground plate 4 for grounding that is buried in the resin flooring material FL of the vehicle V separately from the linear trunk line section 2.

Accordingly, with the wire harness 1, the wiring path can be simplified by combining the linear trunk line section 2 including the power line 21a for power supply, the distributor 3 that is connected to the linear trunk line section 2 and distributes electric power from the power supply 6 to the appliance D to be connected, and the ground plate 4 for grounding that is buried in the resin flooring material FL of the vehicle V. More specifically, in the wire harness 1, the middle wiring body 5 is wired to be branched and spread around the trunk line end distributors 3F and 3R connected to each other via the linear trunk line section 2 not having branching, and the trunk line end distributors 3F and 3R are connected to the respective appliances D. Accordingly, the shape of the wire harness 1 is simplified to be a more compact and space-saving configuration, and the wiring path can be simplified. In this case, in the wire harness 1, by electrically connecting each component to the ground plate 4 for grounding buried in the resin flooring material FL of the vehicle V, the appliance D, the distributor 3, and the like can be ground-connected to the ground plate 4 at desired positions to be connected, via the ground plate 4, to negative sides of batteries 61 and 62 constituting the power supply 6. Due to this, with the wire harness 1, workability at the time of assembling can be improved, and the number of components can be reduced, so that an operation of handling or collecting various wiring bodies can be simplified, for example. That is, the wire harness 1 can be assembled to the vehicle V by assembling the linear trunk line section 2 and the trunk line end distributors 3F and 3R, that is, the common trunk line 10 to the vehicle V, and connecting each of the trunk line end distributors 3F and 3R to each appliance D. Accordingly, with the wire harness 1, efficiency of assembling operation can be improved, an assembling property with respect to the vehicle V can be improved, and manufacturing efficiency can be improved.

With the wire harness 1, the common trunk line 10 constituted of the linear trunk line section 2 and the pair of trunk line end distributors 3F and 3R is made standardized and commoditized as much as possible irrespective of a type of a vehicle, a platform, a grade of a vehicle, and the like, and each middle wiring body 5 and the like connecting the common trunk line 10 to each appliance D are made variable in accordance with a type of a vehicle, a platform, a grade of a vehicle, and the like to be appropriately selected and combined. Accordingly, in addition to the simplification of the wiring path as described above, versatility can be improved due to the standardized and commoditized member, and optimization due to selection diversity of the member can be achieved in a good balance. As a result, the wire harness 1 can have a configuration that is easily applied to various vehicles V.

In the wire harness 1 described above, the linear trunk line section 2 includes the communication line 22 for signal communication serving as a linear wiring body bundled with the power line 21a and wired in the vehicle V. Thus, in the wire harness 1, the linear trunk line section 2 can be configured by bundling the power line 21a with the communication line 22 together to be a trunk line, so that the wiring path can be further simplified, and wiring workability can be further improved.

Additionally, in the wire harness 1 described above, the distributor 3 includes the fastened and grounded part 33 that is fastened to the flooring material FL of the vehicle V and connected to the ground plate 4. Thus, the wire harness 1 can use the fastened and grounded part 33 that fastens and fixes the distributor 3, in this case, the trunk line end distributors 3F and 3R to the vehicle V also for ground-connecting the trunk line end distributors 3F and 3R and the linear trunk line section 2 connected thereto to the ground plate 4 buried in a resin body (flooring material FL) of the vehicle V. As a result, with the wire harness 1, the number of components can be reduced, the distributor 3 can be fastened and fixed, and ground-connected at the same time, the number of operation steps can be reduced, and an operation of handling or collecting various wiring bodies can be simplified. As a result, with the wire harness 1, an assembling property with respect to the vehicle V can be further improved, and manufacturing efficiency can be further improved.

Second Embodiment

The wire harness according to a second embodiment is different from that in the first embodiment in that the trunk line end distributor is constituted of a plurality of divided bodies. In the following description, the same component as that in the above embodiment is denoted by the same reference numeral, and redundant description about the same configuration, operation, and effect will not be repeated (the same applies hereinafter).

Figure 5:
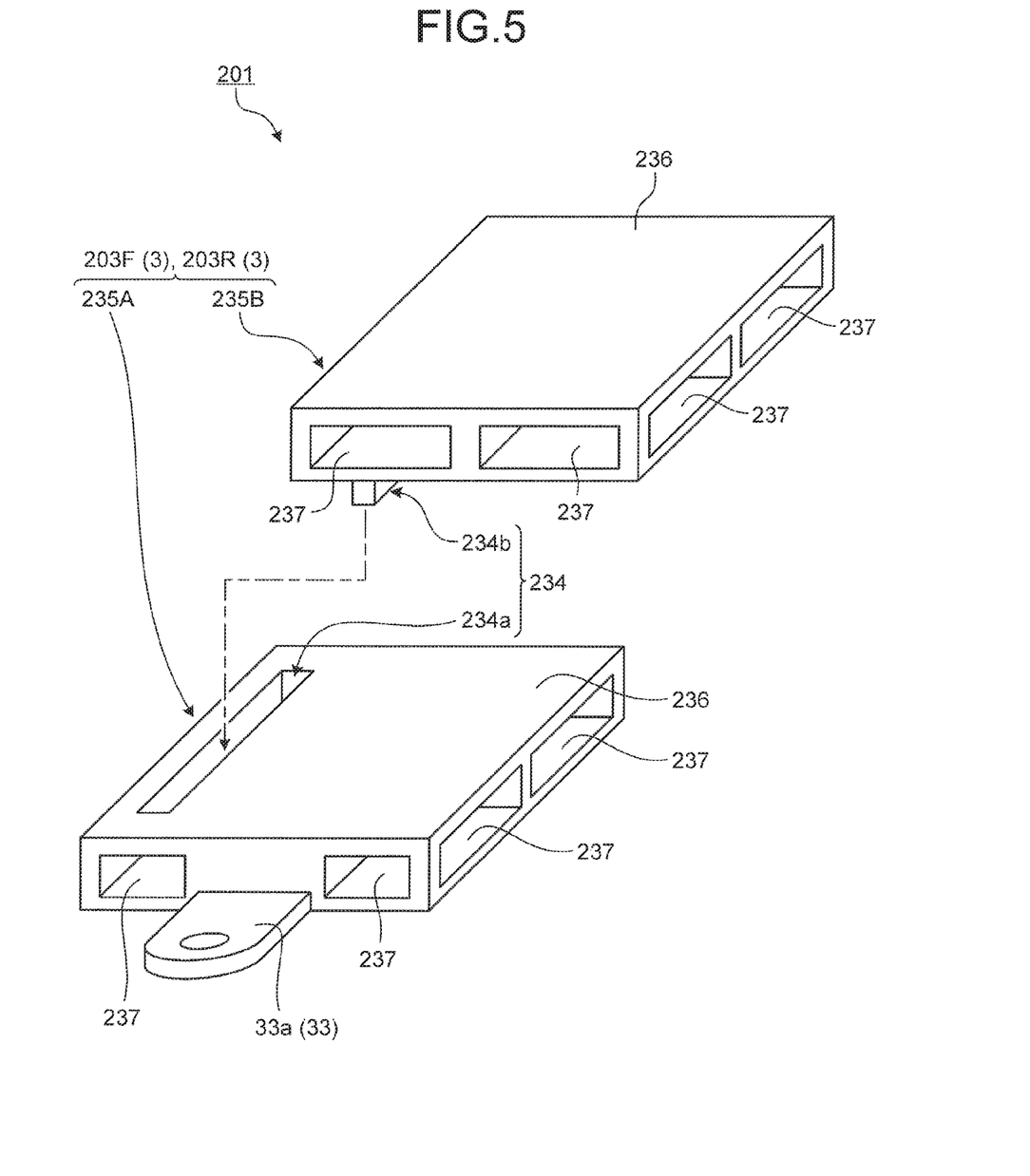
FIG. 5 is a schematic exploded perspective view illustrating a schematic configuration of a distributor of a wire harness according to a second embodiment.

A wire harness 201 according to the present embodiment illustrated in FIG. 5 is different from the wire harness 1 described above in that the wire harness 201 includes trunk line end distributors 203F and 203R in place of the trunk line end distributors 3F and 3R. Other configurations are substantially the same as those of the wire harness 1.

The trunk line end distributors 203F and 203R according to the present embodiment are different from the trunk line end distributors 3F and 3R in that the trunk line end distributors 203F and 203R each include a plurality of divided bodies 235A and 235B that can be coupled to each other via a coupling unit 234 and can be divided via the coupling unit 234. Other configurations are substantially the same as those of the trunk line end distributors 3F and 3R. Herein, both of the trunk line end distributors 203F and 203R are assumed to include the divided bodies 235A and 235B. Alternatively, any one of the trunk line end distributors 203F and 203R may include the divided bodies 235A and 235B. Each of the trunk line end distributors 203F and 203R according to the present embodiment is assumed to include two divided bodies in total, that is, the divided body 235A and the divided body 235B. However, the embodiment is not limited thereto, and each of the trunk line end distributors 203F and 203R may include three or more divided bodies.

Each of the divided bodies 235A and 235B includes a housing 236 and a connection slot 237. The housing 236 houses various functional components such as various power supply distribution functional components and various communication functional components. A plurality of connection slots 237 are arranged as recessed portions on an outer face of the housing 236. A connection part such as a connector arranged at each end of the power supply line 21 and the communication line 22 constituting the linear trunk line section 2 and the middle wiring body 5 is fitted into the connection slot 237, which is a connection part that electrically connects various functional components in the housing 236 to the power supply line 21, the communication line 22, and the middle wiring body 5.

The divided body 235A further includes the bracket 33a described above and a coupling slot 234a constituting the coupling unit 234, in addition to the housing 236 and the connection slot 237. The coupling slot 234a is arranged as a recessed portion on the outer face of the housing 236, typically, relatively the largest face, and configures the coupling unit 234 by which the divided body 235A and the divided body 235B can be coupled to each other, and the divided body 235A and the divided body 235B can be divided from each other. On the other hand, the divided body 235B further includes a coupling insertion part 234b constituting the coupling unit 234 in addition to the housing 236 and the connection slot 237. The coupling insertion part 234b is arranged as a projecting portion on the outer face of the housing 236, typically, relatively the largest face, and configures the coupling unit 234 together with the coupling slot 234a.

The coupling insertion part 234b is inserted and fitted into the coupling slot 234a so that the coupling unit 234 couples the divided body 235A and the divided body 235B to each other to be integrated to configure the trunk line end distributors 203F and 203R, and the coupling unit 234 electrically connects various functional components and the like of the divided body 235A and the divided body 235B to each other. When the coupling insertion part 234b is extracted from the coupling slot 234a, the coupling unit 234 divides the divided body 235A and the divided body 235B from each other to be separated, and releases electrical connection between the various functional components and the like of the divided body 235A and the divided body 235B. In this case, the coupling slot 234a of the coupling unit 234 is arranged on the divided body 235A and the coupling insertion part 234b thereof is arranged on the divided body 235B. However, the embodiment is not limited thereto. The coupling slot 234a may be arranged on the divided body 235B, and the coupling insertion part 234b may be arranged on the divided body 235A. Alternatively, another form of coupling structure may be employed.

Figure 6:
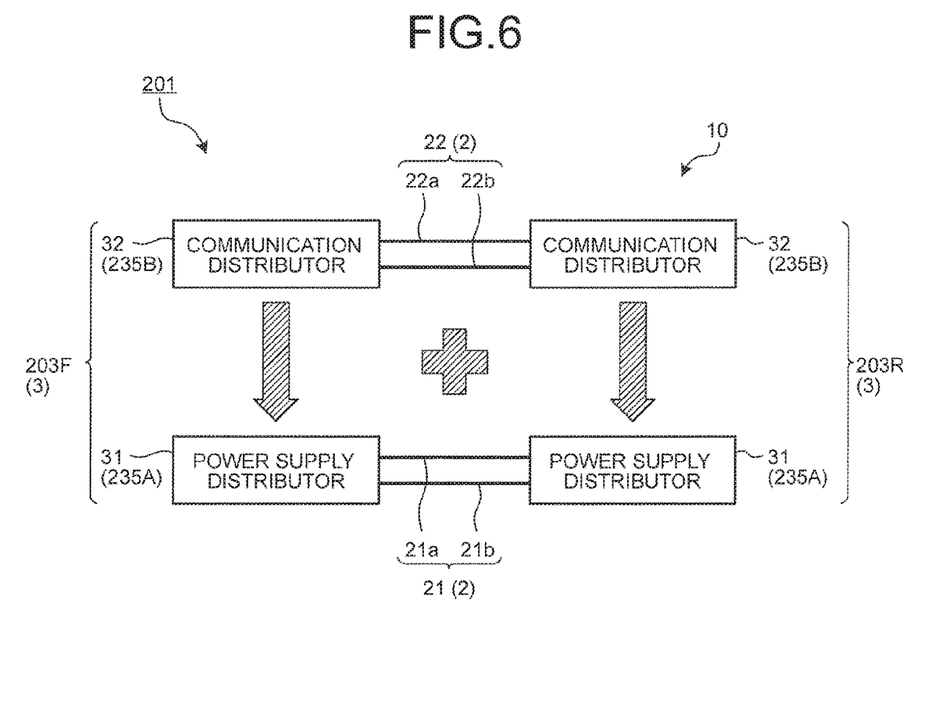
FIG. 6 is a schematic block diagram for explaining a combination of a plurality of divided bodies of the distributor of the wire harness according to the second embodiment.

In each of the trunk line end distributors 203F and 203R, for example, as illustrated in FIG. 6, the divided body 235A may configure the power supply distributor 31, and the divided body 235B may configure the communication distributor 32. That is, in each trunk line end distributors 203F and 203R, the power supply distributor 31 configured as the divided body 235A and the communication distributor 32 configured as the divided body 235B may be integrated with each other via the coupling unit 234 to configure one box unit. In this case, in the linear trunk line section 2, the power supply line 21 including a power line 21b in addition to the power line 21a is connected to the power supply distributor 31 configured as the divided body 235A, for example, and the communication line 22 including the communication lines 22a and 22b is connected to the communication distributor 32 configured as the divided body 235B.

In each of the trunk line end distributors 203F and 203R, for example, the divided body 235A may configure a basic box that is made standardized and commoditized irrespective of a type of a vehicle, a platform, a grade of a vehicle, and the like, and the divided body 235B may configure an expansion box that is appropriately selected or added/expanded in accordance with a type of a vehicle, a platform, a grade of a vehicle, and the like. In each trunk line end distributors 203F and 203R, any one or both of the power supply distributor 31 and the communication distributor 32 may be configured to be dividable into the divided bodies 235A and 235B.

Figure 7:
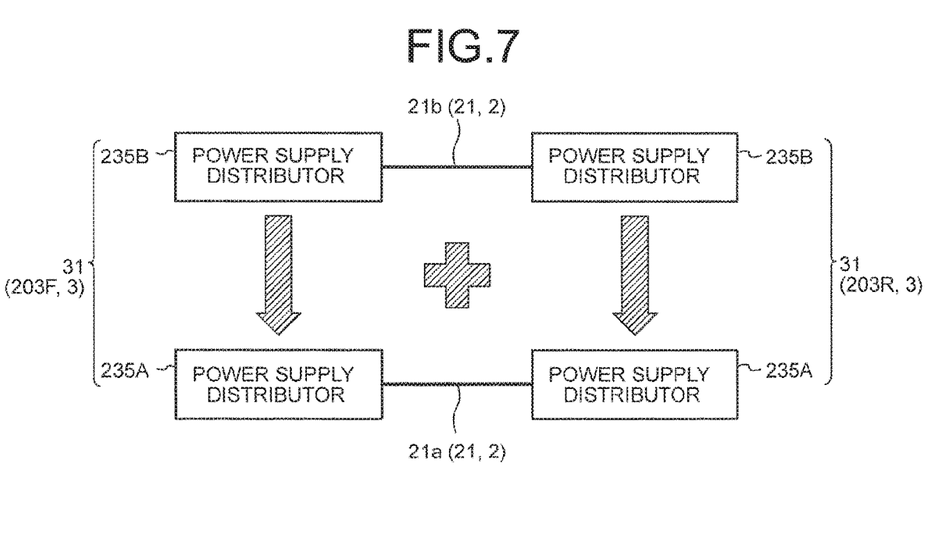
FIG. 7 is a schematic block diagram for explaining a combination of a plurality of divided bodies of the distributor of the wire harness according to the second embodiment.

For example, as exemplified in FIG. 7, in each of the trunk line end distributors 203F and 203R, the power supply distributor 31 may be configured to be dividable into the divided body 233A and the divided body 235B. The divided body 235A configures a basic box of each power supply distributor 31, and the divided body 235B configures an expansion box of each power supply distributor 31. In each power supply distributor 31, the basic box configured as the divided body 235A and the expansion box configured as the divided body 235B may be integrated with each other via the coupling unit 234 to configure one box unit. By way of example, herein, the power supply line 21 is assumed to include the power line 21a connecting basic boxes configured as divided bodies 235A to each other, and the power line 21b connecting expansion boxes configured as divided bodies 235B to each other.

As illustrated in FIGS. 6 and 7, when the power supply line 21 includes the power line 21a and the power line 21b, a power supply system of the power line 21a and a power supply system of the power line 21b may be independent of each other. In this case, in each power supply distributor 31, for example, the power supply system of the power line 21a and the power supply system of the power line 21b may be caused to be different systems at the same voltage, and the appliance D related to a safety system and the like and the appliance D related to a multimedia system and the like may be caused to be different power supply systems, the appliance D related to the safety system and the like being connected to the power supply system of the power line 21a and required to have relatively high reliability, and the appliance D related to the multimedia system and the like being connected to the power supply system of the power line 21b and allowed to have reliability relatively lower than that of the safety system. In each power supply distributor 31, for example, a low voltage power supply system the voltage of which is set to be relatively low (for example, 12 V) may be configured with the power line 21a, and a high voltage power supply system the voltage of which is set to be relatively high (for example, 48 V) may be configured with the power line 21b. In the wire harness 201, for example, the coupling slot 234a can be increased without increasing the systems by causing the power supply line 21 to be one system connected to the divided body 235A and increasing the divided body 235B instead of arranging two systems of the power supply line 21 as illustrated in FIG. 7.

With the wire harness 201 described above, the wiring path can be simplified by combining the linear trunk line section 2 including the power lines 21a and 21b for power supply, the distributor 3 that is connected to the linear trunk line section 2 and distributes electric power from the power supply 6 to the appliance D to be connected, and the ground plate 4 for grounding buried in the resin flooring material FL of the vehicle V.

In the wire harness 201 described above, the distributors 3, herein, the trunk line end distributors 203F and 203R include the divided bodies 235A and 235B that can be coupled to each other via the coupling unit 234 and can be divided from each other via the coupling unit 234. Accordingly, the wire harness 201 can improve expandability, and can also improve versatility.

Third Embodiment

A wire harness according to a third embodiment is different from that in the first embodiment in the configurations of the linear trunk line section and the distributors.

Figure 8:
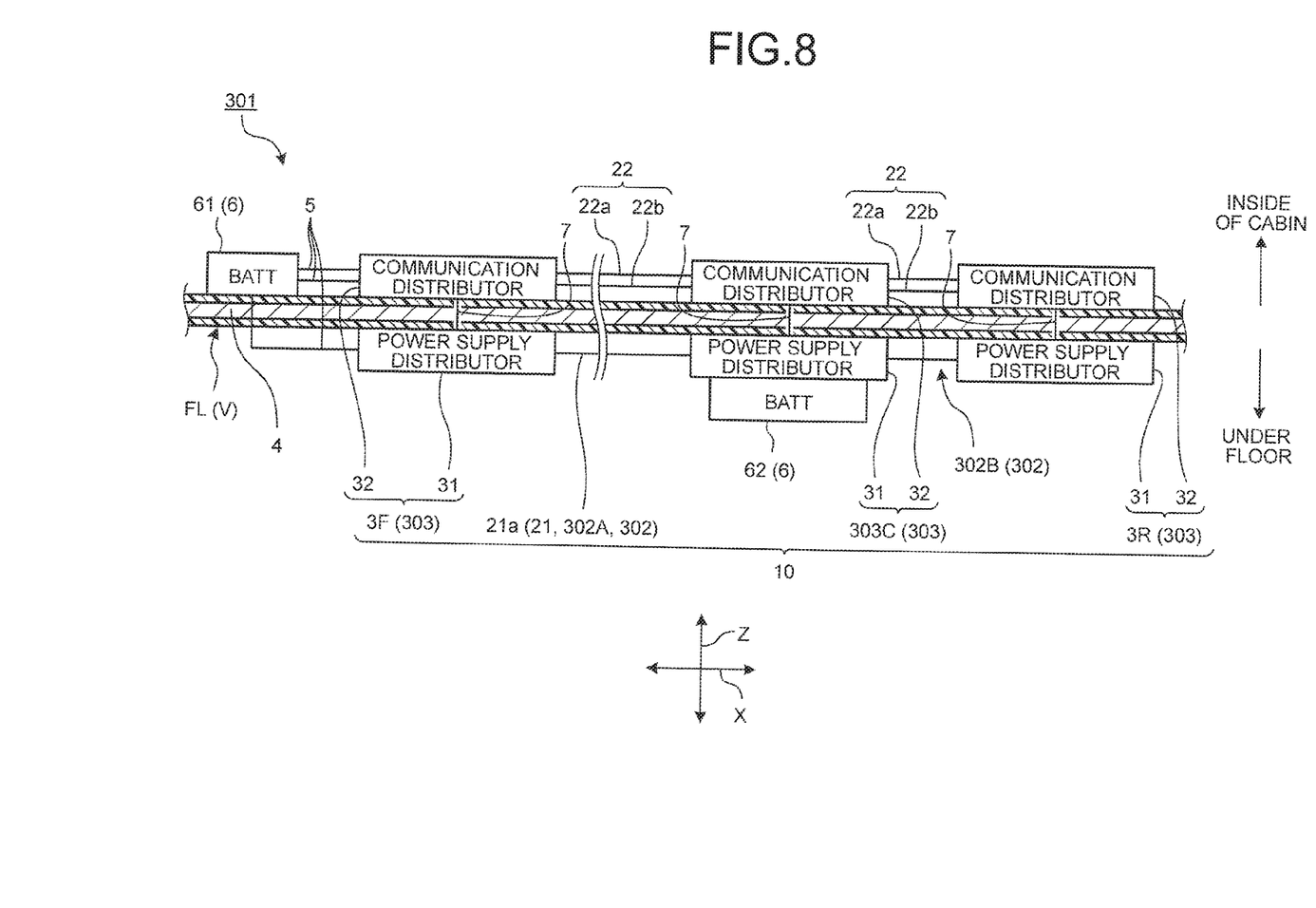
FIG. 8 is a schematic block diagram illustrating a schematic configuration of a wire harness according to a third embodiment.
Figure 9:
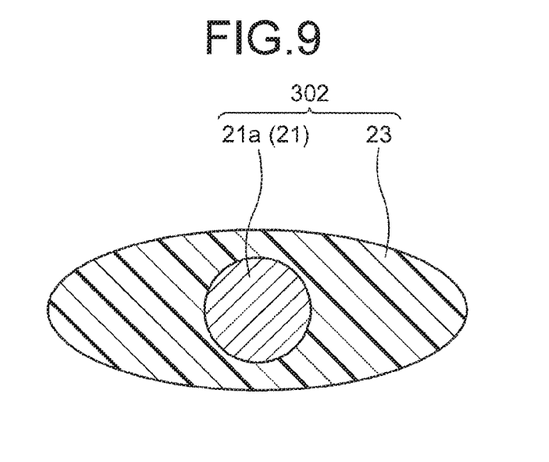
FIG. 9 is a schematic cross-sectional view illustrating a schematic configuration of a linear trunk line section of the wire harness according to the third embodiment.

A wire harness 301 according to the present embodiment illustrated in FIGS. 8 and 9 is different from the wire harness 1 described above in that the wire harness 301 includes a linear trunk line section 302 in place of the linear trunk line section 2, and includes a distributor 303 in place of the distributor 3. Other configurations are substantially the same as those of the wire harness 1.

As exemplified in FIGS. 8 and 9, the linear trunk line section 302 according the present embodiment is different from the linear trunk line section 2 described above in that the linear trunk line section 302 includes the power line 21a and does not include the communication line 22 described above. Other configurations are substantially the same as those of the linear trunk line section 2. That is, the linear trunk line section 302 according to the present embodiment includes one power supply line 21 constituted of the power line 21a and the insulating coating 23. The communication line 22 (communication lines 22a and 22b) according to the present embodiment is configured as a linear wiring body wired in the vehicle V separately from the linear trunk line section 302. That is, the linear trunk line section 302 according to the present embodiment includes one power supply line 21 constituted of the power line 21a and the insulating coating 23.

The distributor 303 according to the present embodiment is different from the distributor 3 described above in that the distributor 303 includes a trunk line middle distributor 303C interposed between both ends of the linear trunk line section 302 in addition to the pair of trunk line end distributors 3F and 3R described above. Other configurations are substantially the same as those of the distributor 3. The trunk line middle distributor 303C is incorporated into middle part of the linear trunk line section 302 to be connected to the linear trunk line section 302. In other words, the trunk line middle distributor 303C is interposed in the linear trunk line section 302 between the pair of trunk line end distributors 3F and 3R. More specifically, the linear trunk line section 302 according to the present embodiment includes a divided trunk line section 302A and a divided trunk line section 302B that are divided at the trunk line middle distributor 303C as a boundary. The divided trunk line section 302A and the divided trunk line section 302B constitute the linear trunk line section 302 such that the divided trunk line section 302A connects the trunk line end distributor 3F to the trunk line middle distributor 303C, and the divided trunk line section 302B connects the trunk line middle distributor 303C to the trunk line end distributor 3R. The trunk line end distributor 3F is connected to a front end in the vehicle longitudinal direction X of the linear trunk line section 302, more specifically, the front end in the vehicle longitudinal direction X of the divided trunk line section 302A. The trunk line end distributor 3R is connected to a rear end in the vehicle 1 longitudinal direction X of the linear trunk line section 302, more specifically, the rear end in the vehicle longitudinal direction X of the divided trunk line section 302B. The trunk line middle distributor 303C is connected to the rear end in the vehicle longitudinal direction X of the divided trunk line section 302A and the front end in the vehicle longitudinal direction X of the divided trunk line section 302B. A connection part such as a connector arranged at one end (front end in the vehicle longitudinal direction X) of the power supply line 21 and the communication line 22 of the divided trunk line section 302A constituting the linear trunk line section 302 are respectively connected to the power supply distributor 31 and the communication distributor 32 of the trunk line end distributor 3F. To each of the power supply distributor 31 and the communication distributor 32 of the trunk line middle distributor 303C, connected are a connection part such as a connector arranged at the other end (rear end in the vehicle longitudinal direction X) of the power supply line 21 and the communication line 22 of the divided trunk line section 302A constituting the linear trunk line section 302, and a connection part such as a connector arranged at one end (front end in the vehicle longitudinal direction X) of the power supply line 21 and the communication line 22 of the divided trunk line section 302B constituting the linear trunk line section 302. To each of the power supply distributor 31 and the communication distributor 32 of the trunk line end distributor 3R, connected is a connection part such as a connector arranged at the other end (rear end in the vehicle longitudinal direction X) of the power supply line 21 and the communication line 22 of the divided trunk line section 302B constituting the linear trunk line section 302. That is, the linear trunk line section 302 connects the trunk line middle distributor 303C and the pair of the trunk line end distributor 3F and the trunk line end distributor 3R to each other such that the divided trunk line section 302A is connected to the trunk line end distributor 3F and the trunk line middle distributor 303C via a connection part such as a connector and extends between the trunk line end distributor 3F and the trunk line middle distributor 303C, and the divided trunk line section 302B is connected to the trunk line middle distributor 303C and the trunk line end distributor 3R via a connection part such as a connector and extends between the trunk line middle distributor 303C and the trunk line end distributor 3R.

Each of the trunk line middle distributor 303C and the trunk line end distributors 3F and 3R includes the power supply distributor 31 and the communication distributor 32 that have the same configuration as described above. Similarly to the trunk line end distributors 203F and 203R described above, the trunk line middle distributor 303C may include a plurality of divided bodies 235A and 235B that can be coupled to each other via the coupling unit 234 and can be divided from each other via the coupling unit 234. The battery 62 according to the present embodiment is electrically connected to the power supply distributor 31 of the trunk line middle distributor 303C, and is electrically connected to the linear trunk line section 302 via the power supply distributor 31. The battery 62 may be connected to the power supply distributor 31 of the trunk line middle distributor 303C via the middle wiring body 5 and the like, or may be directly connected to the power supply distributor 31. The trunk line middle distributor 303C or the trunk line end distributors 3F and 3R, in this case, both of them are grounded on the ground plate 4 via the fastened and grounded part 33 similarly to the above description. In the following description, when the trunk line middle distributor 303C and the trunk line end distributors 3F and 3R are not required to be distinguished from each other, they are simply referred to as the distributor 303. In FIG. 8, the appliance D connected to the trunk line middle distributor 303C is not illustrated. The common trunk line 10 according to the present embodiment includes the linear trunk line section 302, the distributor 303 (the trunk line middle distributor 303C and the pair of trunk line end distributors 3F and 3R), and the battery 62. The common trunk line 10 is arranged in the vehicle V in a positional relation such that the linear trunk line section 302 is wired along the vehicle longitudinal direction X at substantially the center in the vehicle width direction Y, the trunk line end distributor 3F is positioned at the front end in the vehicle longitudinal direction X, the trunk line end distributor 3R is positioned at the rear end in the vehicle longitudinal direction X, and the trunk line middle distributor 303C is positioned between the trunk line end distributor 3F and the trunk line end distributor 3R.

The linear trunk line section 302 according to the present embodiment is wired on one side of the resin flooring material FL of the vehicle V and the ground plate 4 buried in the flooring material FL with respect to the vertical direction, and the communication line 22 is wired on the other side of the flooring material FL and the ground plate 4 with respect to the vertical direction. In the example of FIG. 8, the linear trunk line section 302 wired under the floor as a lower side in the vertical direction of the flooring material FL and the ground plate 4, and the communication line 22 is wired on the inside of the compartment as an upper side in the vertical direction of the flooring material FL and the ground plate 4. Each power supply distributor 31 of the trunk line middle distributor 303C and the trunk line end distributors 3F and 3R (distributors 303) is arranged under the floor as a lower side in the vertical direction of the flooring material FL and the ground plate 4 together with the linear trunk line section 302, and each communication distributor 32 is arranged on the inside of the compartment as an upper side in the vertical direction of the flooring material FL and the ground plate 4 together with the communication line 22. In each of the trunk middle distributor 303C and the trunk line end distributors 3F and 3R, each power supply distributor 31 and each communication distributor 32 are connected to each other, for example, via a coupling wiring body 7 that has a configuration similar to that of the middle wiring body 5 and is wired across the inside of the compartment as an upper side in the vertical direction of the flooring material FL and under the floor as a lower side in the vertical direction. In this case, the battery 62 is also arranged under the floor as a lower side in the vertical direction of the flooring material FL and the ground plate 4 together with the power supply distributor 31 of the trunk line middle distributor 303C. In the above description, in the common trunk line 10, each power supply distributor 31 of the trunk line middle distributor 303C and the trunk line end distributors 3F and 3R is arranged under the floor as a lower side in the vertical direction of the flooring material FL together with the linear trunk line section 302, and each communication distributor 32 is arranged on the inside of the compartment as an upper side in the vertical direction of the flooring material FL together with the communication line 22. However, the embodiment is not limited thereto. Both of the power supply distributor 31 and the communication distributor 32 may be arranged on the inside of the compartment as an upper side in the vertical direction of the flooring material FL, or both may be arranged under the floor as a lower side in the vertical direction of the flooring material FL.

With the wire harness 301 described above, the wiring path can be simplified by combining the linear trunk line section 302 including the power line 21a for power supply, the distributor 303 that is connected to the linear trunk line section 302 and distributes electric power from the power supply 6 to the appliance D to be connected, and the ground plate 4 for grounding buried in the resin flooring material FL of the vehicle V.

In the wire harness 301 described above, the distributor 303 includes the pair of trunk line end distributors 3F and 3R each of which is connected to a corresponding one of both ends of the linear trunk line section 302, and the trunk line middle distributor 303C to which the battery 62 is connected being interposed in the linear trunk line section 302 between the pair of trunk line end distributors 3F and 3R, the battery 62 being mounted on the vehicle V to accumulate electric power. Accordingly, with the wire harness 301, the wiring path can be further simplified by combining the pair of trunk line end distributors 3F and 3R with the trunk line middle distributor 303C to which the battery 62 is connected being incorporated in the linear trunk line section 302.

The wire harness 301 described above includes the communication line 22 for signal communication serving as a linear wiring body wired in the vehicle V separately from the linear trunk line section 302. The linear trunk line section 302 is wired on one side of the ground plate 4 with respect to the vertical direction, and the communication line 22 is wired on the other side of the ground plate 4 with respect to the vertical direction. Thus, in the wire harness 301, the communication line 22 is wired on the opposite side of the linear trunk line section 302 including the power supply line 21 across the metal ground plate 4, so that the ground plate 4 can be caused to function as a shielding plate (shielding member), which can reduce influence of electromagnetic noise in the communication line 22.

The wire harness according to the embodiments of the present invention described above is not limited to the embodiments, and can be variously modified without departing from the scope of the invention. The wire harness according to the present embodiment may be configured by appropriately combining components in the embodiments described above and modifications.

According to the above description, the trunk line end distributors 3F, 3R, 203F, and 203R, the trunk line middle distributor 303C, and the linear trunk line sections 2 and 302 connected thereto may be ground-connected to the ground plate 4 to be connected to the negative sides of the batteries 61 and 62 constituting the power supply 6 via an electric wire for grounding and the like extending from the trunk line end distributors 3F, 3R, 203F, and 203R, and the trunk line middle distributor 303C without the fastened and grounded part 33 described above.

In the above description, the linear trunk line section 2 includes the communication line 22 for signal communication bundled with the power supply lines 21. However, the linear trunk line section 2 does not necessarily include the communication line 22 like the linear trunk line section 302 illustrated in FIGS. 8 and 9, and the trunk line end distributors 3F, 3R, 203F, and 203R and the trunk line middle distributor 303C do not necessarily include the communication distributor 32. The wire harnesses 1, 201, and 301 may implement communication between the trunk line end distributors 3F and 203F, the trunk line middle distributor 303C, and the trunk line end distributors 3R and 203R through wireless communication of various systems such as near field radio communication (NFC) including N-LAN, Wi-Fi (registered trademark), and Bluetooth (registered trademark), for example, without using wired communication via the communication line 22. In this case, each communication distributor 32 may include a wireless communication functional component such as a transmission/reception unit of various systems and an antenna. The communication line may be shared by the power supply line 21 to be used in the power line communications (PLC) described above.

In the above description, the power supply lines 21 are linear conductors used for power supply and each include one power line 21a for power supply. However, the embodiment is not limited thereto. For example, the ground wire may be arranged separately from the power supply line 21 of the linear trunk line sections 2 and 302, or a plurality of power lines 21*a* and 21*b* may be arranged as illustrated in FIGS. 6 and 7.

In the above description, each of the power supply line 21 and the communication line 22 is a wiring body that is formed in a linear shape and does not have branching between the pair of ends, and the trunk line section is each of the linear trunk line sections 2 and 302 that is formed in a linear shape and does not have branching between the pair of ends. However, the embodiment is not limited thereto. Each of the power supply line 21. The communication line 22, and the trunk line section may have branching.

With the wire harness according to the present embodiments, the wiring path can be simplified by combining the trunk line section including the power line for power supply, the distributor that is connected to the trunk line section and distributes electric power from the power supply to the connected appliance, and the ground plate for grounding buried in the resin flooring material of the vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
    a trunk line section including a wiring body power line for power supply, wired in a vehicle;
    a distributor that is connected to the trunk line section and distributes electric power from a power supply mounted on the vehicle to an appliance to be connected;
    a ground plate for grounding buried in so as to be covered by a resin flooring material of the vehicle, the ground plate provided separately from the trunk line section; and
    a communication line serving as a wiring body for signal communication wired in the vehicle and provided separately from the trunk line section, wherein
    the trunk line section is wired on one side of the ground plate with respect to a vertical direction,
    the communication line is wired on another side of the ground plate with respect to the vertical direction, and
    the ground plate is caused to function as a shielding plate, which can reduce influence of electromagnetic noise in the communication line.

2. The wire harness according to claim 1, wherein
    the trunk line section includes a communication line serving as a wiring body for signal communication bundled with the power line and wired in the vehicle.

3. The wire harness according to claim 1, wherein
    the distributor includes a fastened and grounded part that is fastened to the vehicle and connected to the ground plate.

4. The wire harness according to claim 2, wherein
    the distributor includes a fastened and grounded part that is fastened to the vehicle and connected to the ground plate.

5. The wire harness according to claim 1, wherein
    the distributor includes a plurality of divided bodies that are able to be coupled to each other via a coupling unit and are able to be divided from each other via the coupling unit.

6. The wire harness according to claim 2, wherein
    the distributor includes a plurality of divided bodies that are able to be coupled to each other via a coupling unit and are able to be divided from each other via the coupling unit.

7. The wire harness according to claim 3, wherein
    the distributor includes a plurality of divided bodies that are able to be coupled to each other via a coupling unit and are able to be divided from each other via the coupling unit.

8. The wire harness according to claim 1, wherein
    the distributor includes a pair of trunk line end distributors each of which is connected to a corresponding one of both ends of the trunk line section, and a trunk line middle distributor to which a power storage device that is mounted on the vehicle and accumulates electric power is connected, the trunk line middle distributor being interposed in the trunk line section between the pair of trunk line end distributors.

9. The wire harness according to claim 2, wherein
    the distributor includes a pair of trunk line end distributors each of which is connected to a corresponding one of both ends of the trunk line section, and a trunk line middle distributor to which a power storage device that is mounted on the vehicle and accumulates electric power is connected, the trunk line middle distributor being interposed in the trunk line section between the pair of trunk line end distributors.

10. The wire harness according to claim 3, wherein
    the distributor includes a pair of trunk line end distributors each of which is connected to a corresponding one of both ends of the trunk line section, and a trunk line middle distributor to which a power storage device that is mounted on the vehicle and accumulates electric power is connected, the trunk line middle distributor being interposed in the trunk line section between the pair of trunk line end distributors.

11. The wire harness according to claim 5, wherein
    the distributor includes a pair of trunk line end distributors each of which is connected to a corresponding one of both ends of the trunk line section, and a trunk line middle distributor to which a power storage device that is mounted on the vehicle and accumulates electric power is connected, the trunk line middle distributor being interposed in the trunk line section between the pair of trunk line end distributors.

* * * * *